(12) United States Patent
Ghuge et al.

(10) Patent No.: US 11,181,975 B2
(45) Date of Patent: Nov. 23, 2021

(54) FIELD OF VIEW MOVEMENT VARIATION-BASED SECURITY PROFILE ASSIGNMENT TO PHYSICAL ASSETS AT A LOCATION

(71) Applicant: International Business Machines Corporation, Armonk, NY (US)

(72) Inventors: Deepak Ghuge, Sangamner (IN); Sasikanth Eda, Vijayawada (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/817,151

(22) Filed: Mar. 12, 2020

(65) Prior Publication Data
US 2021/0286425 A1    Sep. 16, 2021

(51) Int. Cl.
*G06F 3/01*      (2006.01)
*G06T 11/00*     (2006.01)
*G06F 21/62*     (2013.01)

(52) U.S. Cl.
CPC .............. *G06F 3/012* (2013.01); *G06F 21/62* (2013.01); *G06T 11/00* (2013.01)

(58) Field of Classification Search
CPC .......... G06F 3/012; G06F 3/013; G06F 21/62; G06T 11/00; G06T 15/00
See application file for complete search history.

(56) References Cited

U.S. PATENT DOCUMENTS

| | | | |
|---|---|---|---|
| 9,679,152 | B1 | 6/2017 | Young et al. |
| 2013/0293468 | A1 | 11/2013 | Perez et al. |
| 2017/0293353 | A1* | 10/2017 | Ahuja ..................... G06F 3/012 |
| 2017/0316186 | A1 | 11/2017 | Breitenfeld et al. |
| 2018/0061127 | A1* | 3/2018 | Gullicksen ............ G06F 3/0383 |
| 2018/0095617 | A1* | 4/2018 | Valdivia .................. G06F 3/013 |
| 2018/0276830 | A1 | 9/2018 | Bostick et al. |

OTHER PUBLICATIONS

"Augmented Reality for Physical Security," Fortem, Printed: Dec. 11, 2019, 6 pages. http://fortem.com/augmented-reality-for-physical-security/.

Fineman et al., "Securing Your Reality: Addressing Security and Privacy in Virtual and Augmented Reality Applications," EDUCAUSEreview, May 21, 2018, 5 pages. https://er.educause.edu/articles/2018/5/securing-your-reality-addressing-security-and-privacy-in-virtual-and-augmented-reality-applications.

(Continued)

*Primary Examiner* — Robert J Michaud
(74) *Attorney, Agent, or Firm* — Mark Bergner

(57) ABSTRACT

A computer-implemented system and method for assigning security profiles comprises receiving bounded region information that is located within a defined region associated with a user from an augmented reality device (ARD) associated with the user. A bounded region is created from the bounded region information. A first set of selectable entities, such as subjects for whom the security profile is being applied and/or secure elements, such as cabinets, doors, or computer resources, are selected as those being within the bounded region information. A security profile to the first set of selectable entities is then applied relative to a second set of selectable entities.

19 Claims, 7 Drawing Sheets

(56) References Cited

OTHER PUBLICATIONS

Suganya et al., "Augmented Reality in Security Systems," Research Journal of Information Technology, vol. 5 (2), 2013, pp. 256-261. https://scialert.net/fulltextmobile/?doi=rjit.2013.256.261.
Mell et al., "The NIST Definition of Cloud Computing", Recommendations of the National Institute of Standards and Technology, Special Publication 800-145, Sep. 2011, 7 pages.

* cited by examiner

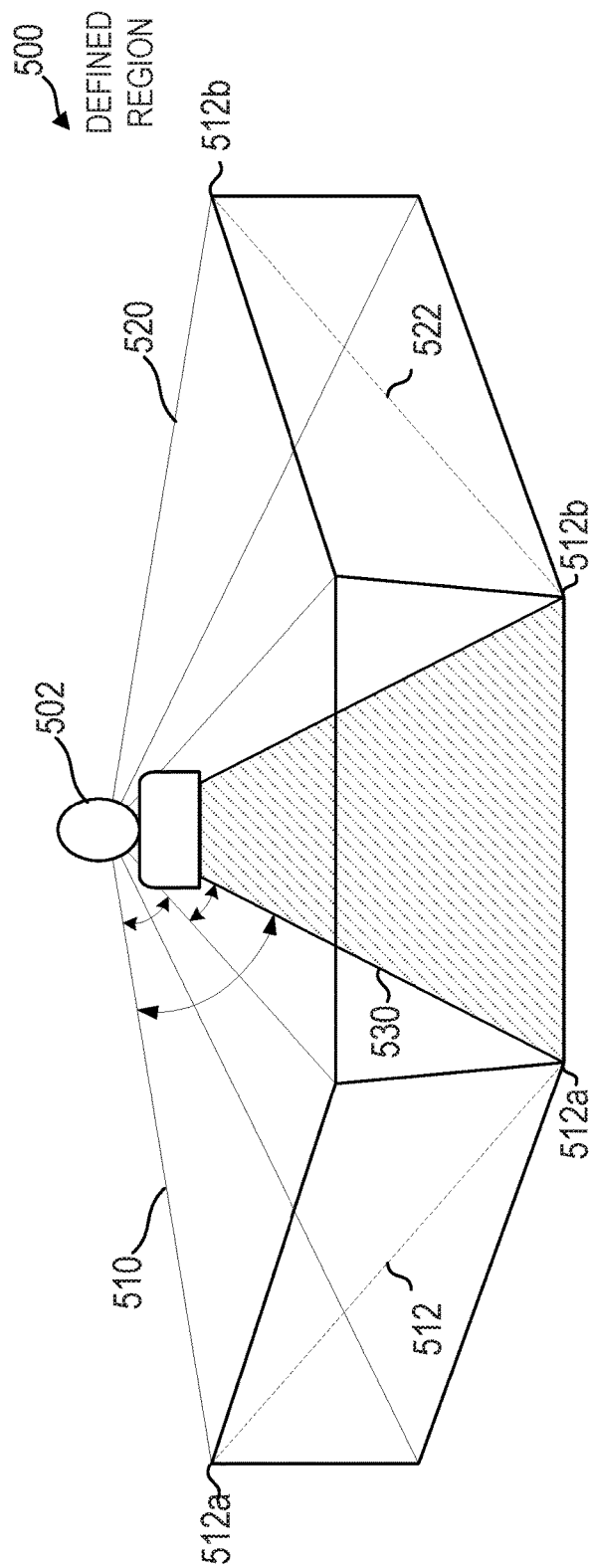
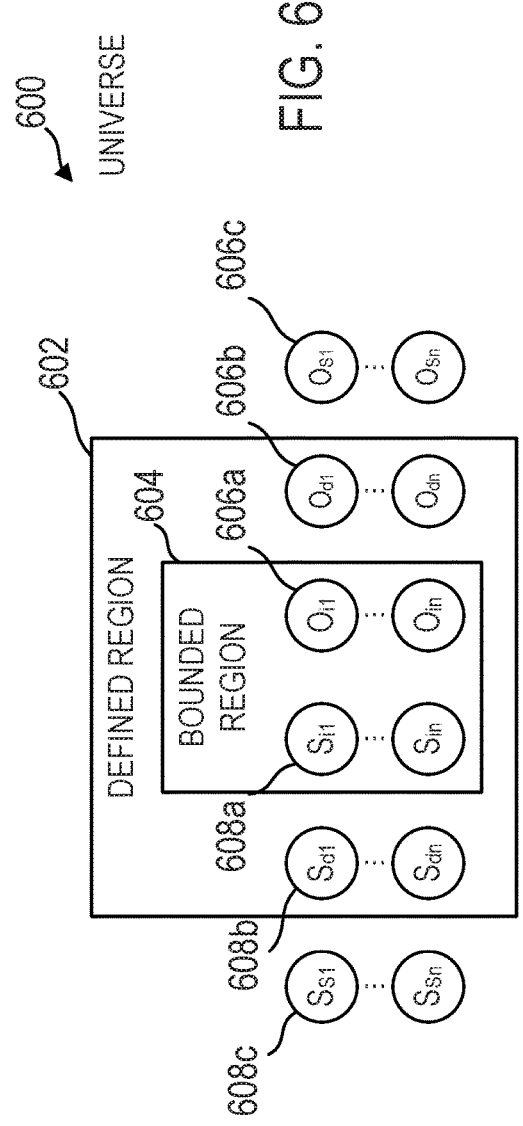
FIG. 5
FIG. 6

FIELD OF VIEW MOVEMENT VARIATION-BASED SECURITY PROFILE ASSIGNMENT TO PHYSICAL ASSETS AT A LOCATION

BACKGROUND

Disclosed herein is a system and related method for a field of view movement variation-based security profile assignment to physical assets at a location. When the number of physical assets to protect becomes large and/or the number of individuals to modify access to the assets becomes large, it has historically been cumbersome to apply a security profile.

SUMMARY

According to one aspect disclosed herein, a computer-implemented method is provided comprising, receiving bounded region information that is located within a defined region associated with a user from an augmented reality device (ARD) associated with the user, and creating a bounded region from the bounded region information. The method comprises selecting a first set of selectable entities as those being within the bounded region information, and assigning a security profile to the first set of selectable entities relative to a second set of selectable entities.

According to another aspect disclosed herein, a security profile assignment system is provided, comprising a processor configured to receive bounded region information that is located within a defined region associated with a user from an augmented reality device (ARD) associated with the user, and create a bounded region from the bounded region information. The processor is further configured to select a first set of selectable entities as those being within the bounded region information, and assign a security profile to the first set of selectable entities relative to a second set of selectable entities.

A computer program product may include instructions that, when run on a processor, implement the methods described herein.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings:

FIG. 5 is a pictorial diagram illustrating a user's fields of view, according to some embodiments.

FIG. 6 is a block diagram illustrating different applicable regions, according to some embodiments.

DETAILED DESCRIPTION

Figure 1:
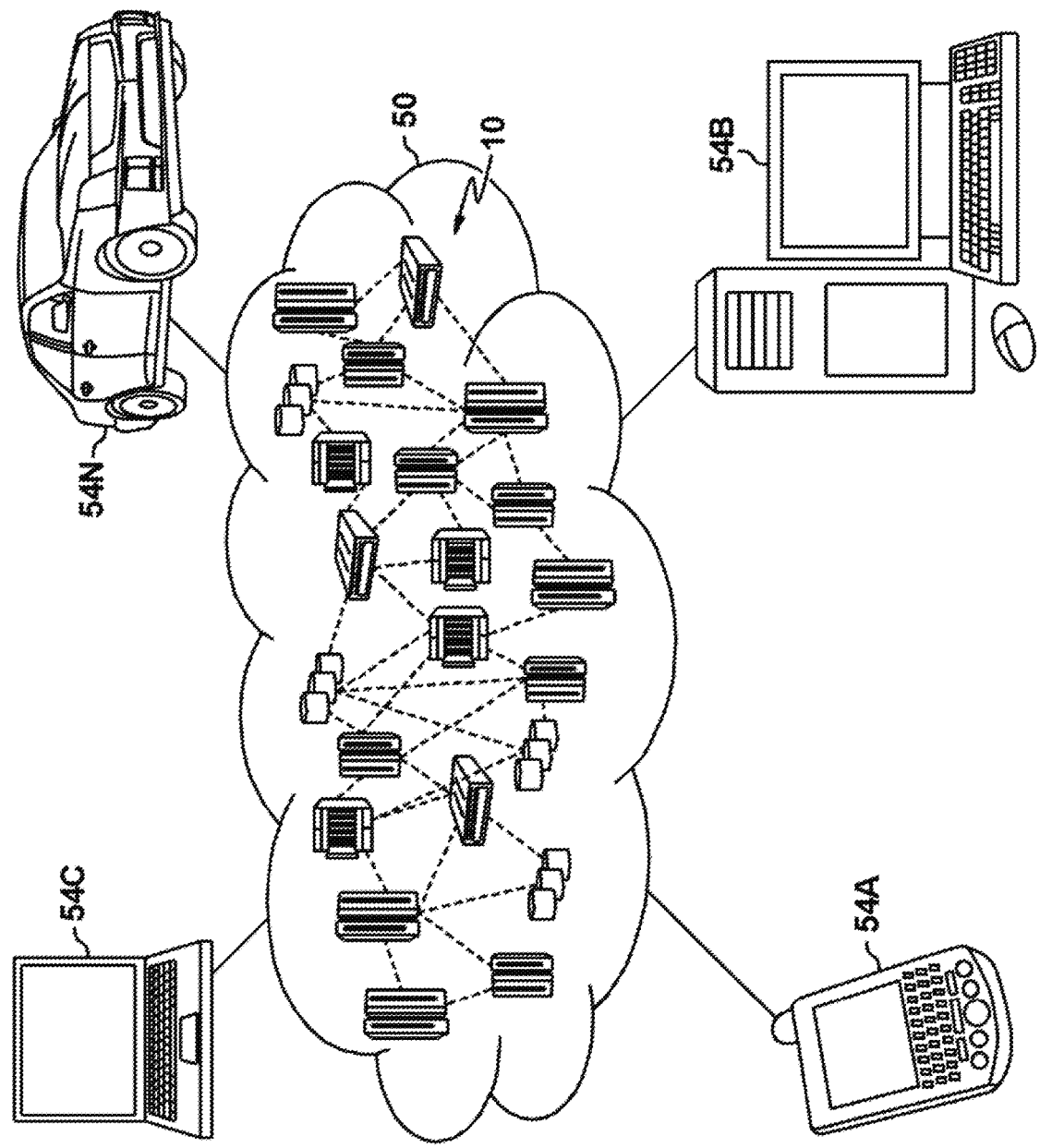
FIG. 1 depicts a cloud computing environment according to an embodiment of the present invention.

Disclosed herein is a system and related method for a field of view movement variation-based security profile assignment to physical assets or "secure elements" at a location. The use of virtual reality (VR) and augmented reality (AR) (sometimes referred to as "mixed reality") may serve as a user interface for entering information and receiving feedback. Specifically, this user interface may serve as a mechanism for selecting boundaries within which subjects (people for whom a security profile is being applied) and secure elements (physical objects or computer-related assets) (or both) are present and to which a security profile is being applied.

The following acronyms may be used below:
API application program interface
AR augmented reality
ARD augmented reality device
ARM advanced RISC machine
CD-ROM compact disc ROM
CMS content management system
CoD capacity on demand
CPU central processing unit
CUoD capacity upgrade on demand
DPS data processing system
DVD digital versatile disk
EPROM erasable programmable read-only memory
FOV field of view
FPGA field-programmable gate arrays
GPS global positioning system
HA high availability
IaaS infrastructure as a service
I/O input/output
IPL initial program load
ISP Internet service provider
ISA instruction-set-architecture
LAN local-area network
LPAR logical partition
PaaS platform as a service
PDA personal digital assistant
PLA programmable logic arrays
RAM random access memory
RISC reduced instruction set computer
ROM read-only memory
SaaS software as a service
SLA service level agreement
SRAM static random-access memory
VR virtual reality
WAN wide-area network
Cloud Computing in General It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
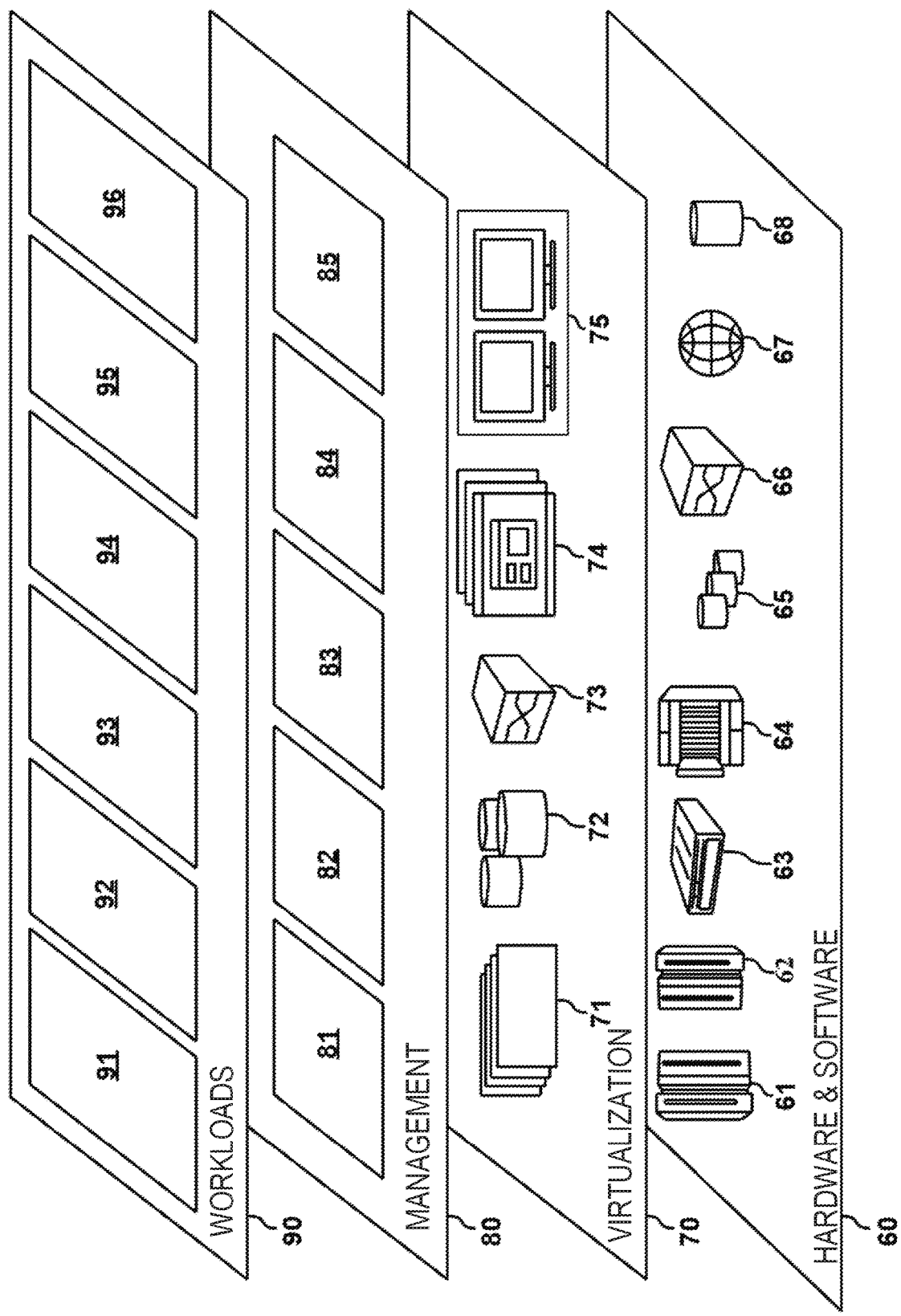
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Data Processing System in General

Figure 3:
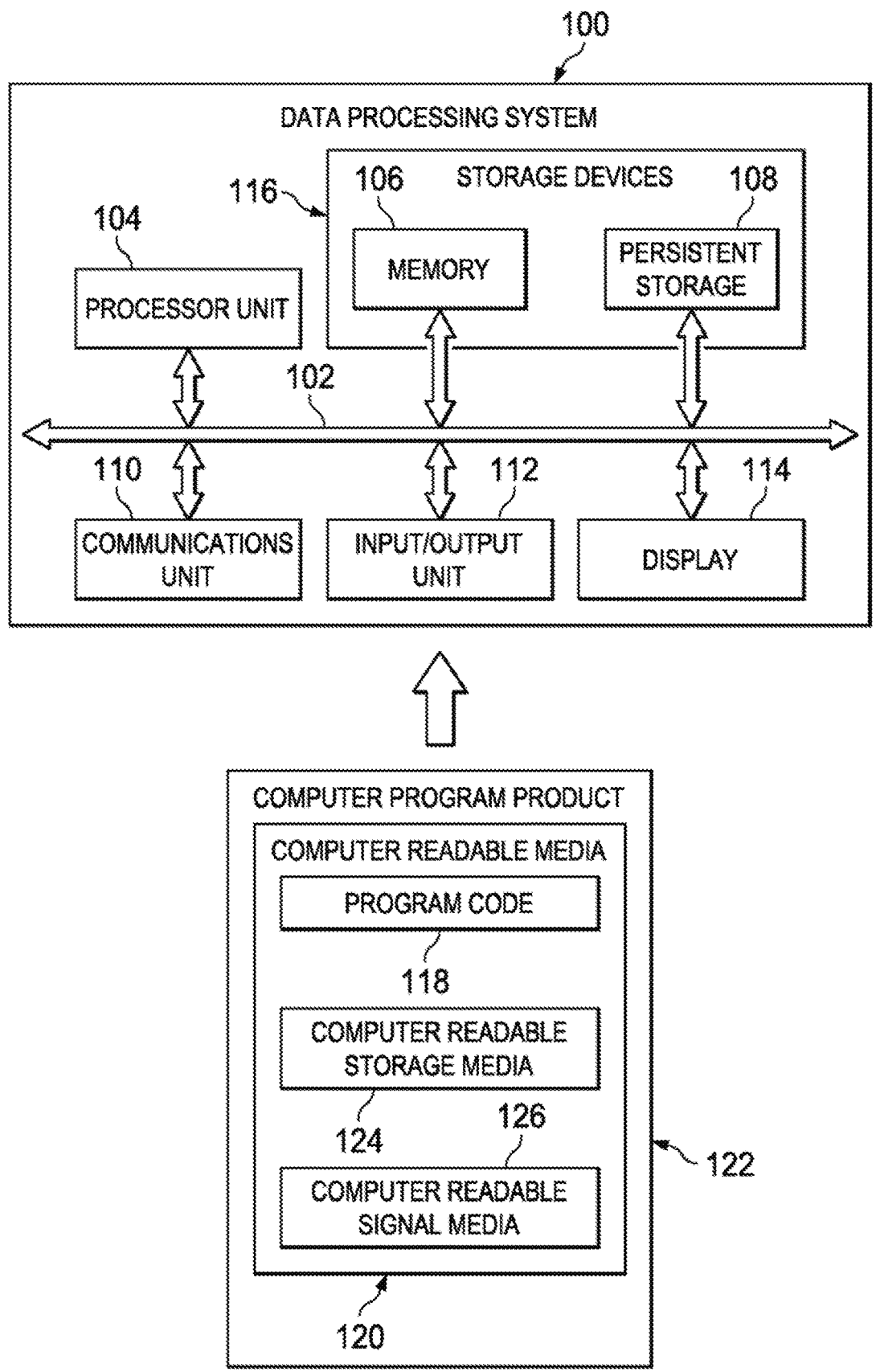
FIG. 3 is a block diagram of a DPS according to one or more embodiments disclosed herein.

FIG. 3 is a block diagram of an example DPS according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an I/O unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FOV Security Profile Assignment

The present disclosure focuses on the application of AR/VR technology to security within a user's surroundings. Such security may relate to physical security, such as entry and exit to a bounded physical region (building, room, filing cabinet) as well as technical security, such as access to computer systems, networks, devices, files, etc., associated with a particular bounded physical region. Defining proper access to such regions and systems can be a time-consuming effort when performed in a traditional manner. However, applying AR/VR technology to assist in providing these definitions may be beneficial by, among other things, reducing time and effort required to perform various security-related tasks.

AR systems and VR systems share aspects in common. In VR systems, a user may view and interact with an environment that is entirely digitally created. By using various user interface devices, such as a head-mounted display, an environment may be presented to the user that has been generated by a computer. Similarly, the user may be able to interact with that generated environment by the use of special gloves or other data entry mechanisms. AR systems share these features with VR systems. However, instead of the user being presented with an entirely generated environment, the user may be presented with only a partially generated environment, with the remainder of the environment being perceived as it actually is. Additional or alternate information may be overlaid on top of what the user is perceiving about the actual environment. An alternative way of viewing the relationship is that a VR system may be construed as an AR system in which 100% of the information in a user's surrounding is overlaid. For the sake of conciseness herein, an AR system will be referred to. However, it is to be understood that reference to an AR system is also meant to include a VR system as an AR system with a 100% overlay of information.

The disclosure herein addresses a system and method by which a user may use AR devices, such as glasses or smart contact lens, for selectively assigning access to one or more secure elements ("assets" or "physical assets" may form part of the secure elements described herein) to one or more persons (also referred to herein as "subjects") within a field of view (FOV) of the user. According to some embodiments disclosed herein, a user can request access permissions to one or more assets within their FOV and, at the same time, the user can selectively change a security profile of one or more secure elements, such as IoT connected assets, present in or accessible via the physical ecosystem.

Figure 4A:
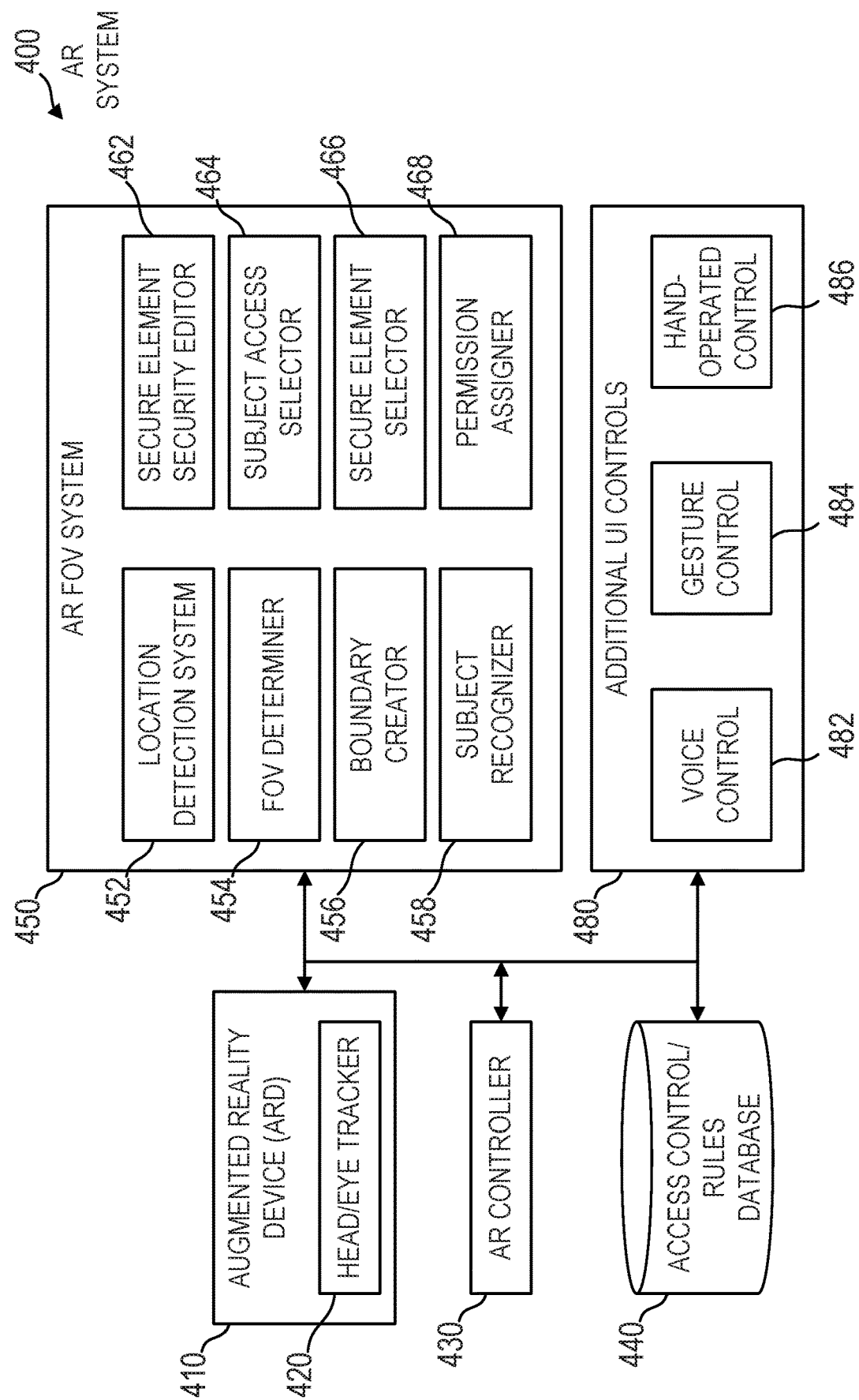
FIG. 4A is a block diagram of one or more embodiments of a security profile assignment system, according to some implementations.

FIG. 4A is a block diagram illustrating an example of an AR system 400 that may be utilized for performing the various processes and functions described herein. The system 400 may comprise an augmented reality device (ARD) 410, an AR controller 430, an access control/rules database 440, an AR field-of-view (FOV) system 450, and additional user interface (UI) controls 480. The ARD 410, AR controller 430, and AR FOV system 450 may each be, in some embodiments, a DPS 100, as described above.

The ARD(s) 410 may include glasses, smart contact lenses, helmets, goggles, gloves, and other devices that allow a user to receive and transmit data as well as interact with the FOV system 450 (and other systems/databases). One element of an ARD 410 in the present system 400 is a head/eye tracker 420 that permits the system 450 to determine a direction that the user is looking in, in the real world. In order to make an accurate line of sight determination, it is useful to know both the head position/orientation and the eye position/orientation.

The head/eye tracker 420 may determine head position/orientation using known technology that includes various sensors, such as accelerometers, leveling devices, and the like. The eye position/orientation may be determined using known technology that includes image sensors, such as cameras and the like. The head/eye tracker 420 may process this information to determine a gaze vector representing the orientation of the user's gaze. As defined herein, the gaze vector is a vector along a user's line of sight, at the center of the user's view, and corresponds to a line along a light ray from the center of a user's iris to the fovea centralis at the rear of the eye. The FOV of a user is a cone-shaped volume along the gaze vector that subtends some angle between the gaze vector and the cone edge.

In order to map the user's gaze into real-world coordinates, additional information about the user's location, specifically the user's eye location, may be provided. Coordinate location mechanisms, such as global positioning system (GPS) sensors, indoor positioning systems, and the like, may be utilized along with user characteristics (e.g., height) and positioning information (e.g., standing, sitting, etc.) to determine a starting location in 3D space for the gaze vector. This gaze vector information may be combined with topographical information in the proximity of the user to determine a real-world position that the user is looking at, referred to herein as a gaze location point. The topographical information may be predetermined already, or may be produced via sensors associated with the ARD 410 or the user's environment. The real-world view information may be determined utilizing the AR controller 430 associated with the ARD 410 to produce an output location in real-world coordinates for the user's gaze.

In a VR system, in which the entirety of the user's view is generated, the coordinates may not be real-world coordinates, but may still be coordinates based off of a base reference coordinate location/system. For example, a user may be sitting in a home office interacting with a VR world representative of a new satellite office in a different part of the world. In this example, a coordinate system consistent with the user's VR view may be utilized rather than the user's physical location.

The ARD 410 may interact with the AR FOV system 450, which may, in some embodiments, comprise a location detection system 452 that performs some of the functions related to the user's location described above. The user's location obtained from the location detection system 452 may be utilized to determine the user's FOV by an FOV determiner 454. The FOV of a user comprises a viewing volume that is centered on the gaze vector and comprises some solid angle about the gaze vector. Such a solid angle view may be measured in steradians. The focus of a user's view may be relatively sharper along the gaze vector and gradually taper off on the sides. There may be no clear delineation to something being within a user's FOV and it being outside of the user's FOV.

The FOV may vary between users, and may vary within a given individual, depending on a particular task. For example, a visually demanding task, such as reading, may occur within a relatively narrow FOV of a user, whereas a visually non-demanding task, such as detecting movement or a flashing light, may occur within a relatively broad FOV of the user. However, for the purposes herein, a user's FOV may be defined as having a specific value (e.g., in configuration parameters of the software, based upon user feedback, or even via a controllable input by the user) in order to make use of a user's FOV predictable and usable by the FOV determiner 454. The user's FOV in a spatial region at any particular point in time may thus be determined by the FOV determiner 454 using the user's gaze vector combined with a predefined angular measure (e.g., 10°) from the gaze vector.

A boundary creator 456 may be utilized by the user to establish one or more bounded regions within a defined area that may be used in subsequent security operations. Defined regions are described in greater detail with respect to FIG. 5.

FIG. 5 is a pictorial illustration of a defined region 500 within which a user is located. In an example use case, the user may be located at a position 502 within the defined region 500 and wishes to define one or more bounded regions 510, 520, 530. Referring back to FIG. 4, the boundary creator 456 may be used to assist the user in doing so. The boundary creator 456, at a given point in time, may collect a gaze location point that the user is looking at along with some form of collection indication that location information about this point should be collected.

The collection indication may come from, for example, one of the additional UI controls 480 shown in FIG. 4A. The additional UI controls 480 may include, but are not limited to, voice control 482, gesture control 484, and a hand operated control 486. For the voice control 482, the user may speak commands to the AR FOV system 450 that are interpreted by, e.g., a speech-to-text routine (not shown). In FIG. 5, the user may look at a first bounded region 510 first gaze location point 512a, and then say, e.g., "collect point". In this example, the voice control 482 interprets this instruction to mean that the user intends to define a boundary region (the first bounded region 510 in this example), and that this "collect point" instruction means that the first gaze location point 512a will define one of the boundary's points. A series of commands may be entered using the voice control 482, including those for indicating what type/shape of bounded region the user intends to add (2D shape (circular, rectangular, polygon, etc.); or 3D shape (cone, prism, etc.). The terms boundary, boundary region, and bounded region, as defined herein may be used to mean the same thing and be interchangeable. The type (2D area, 3D volume) and format of the bounded region may be user selectable.

In some implementations, a gesture control 484 may be used as the mechanism for collecting commands, similar in operation to the voice commands described above. For example, the user may wave her right hand or hold up two fingers to indicate the "collect point" command. Such gestures may be read by, e.g., image sensors or a hand glove, and interpreted into the relevant command. In some implementations, a hand-operated control 486 may be used as the mechanism for collecting commands, such as a push button or the like. In some implementations, the boundary creator 456 may provide positive or negative feedback with respect to whether the information about the gaze location point was successfully collected or not, and if not, the user may be provided with a further opportunity(s) to collect the gaze location point information again.

Other points of the first bounded region 510 may be collected as well. In some implementations, the user may indicate to the boundary creator 456 the type/shape of the bounded region 510 they are trying to collect prior to collecting any points. In this way, the boundary creator 456 may know how many points to expect. By way of example, and as illustrated in FIG. 5, the user may indicate in advance that they wish to create a rectangular prism as the first bounded region 510, having a rectangular base 514. The boundary creator 456 may then know to expect two gaze location points 512a, 512b to be collected that form a diagonal line 512 defining the rectangular base 514. Once these two points 512a, 512b are collected, the boundary creator 456 may confirm them with the user to ensure that they are the correct ones. As shown in FIG. 5, a similar procedure may take place for defining the second bounded region 520.

In other implementations, the boundary creator 456 may attempt to deduce the type of region that the user is trying to collect after a certain number of points have been collected. For example, the boundary creator 456, upon collecting the second 512b of the two gaze location points, may present a menu of possible boundary shapes that the user is attempting to collect points for and solicit a selection from the user. By way of example, once the second point 512b has been collected, the boundary creator 456 may present a list of a 2D rectangle and a 3D rectangular prism (in either case, the point selection is complete), and additionally, the list may include a 2D triangle, in which case an additional point is needed (when the user selects a shape for which additional points are needed, the boundary creator 456 may indicate this fact to the user). In some implementations, the bounded region is simply the gaze point along with its associated FOV.

Various basic shapes may be combined to form more complex shapes for boundaries. For example, the user may combine the first bounded region 510 with the second bounded region 520 to create a comparatively complex selected region (in this example, the regions are not contiguous). By combining basic shapes into more complex shapes, a much larger selected region may be accessed. The shapes may be dissimilar in terms of their type. For example, in FIG. 5, a 2D triangular region (shaded region 530) may be defined by the user gazing at and collecting two points (as shown in FIG. 5, the gaze points 512b, 522b), and this 2D triangular region 530 may be combined with the first bounded region 510 and the second bounded region 520 to create the selected region (the bounded region, as defined herein).

FIG. 6 is a block diagram that illustrates a delineation of the different regions. From the universe 600, a defined region 602 within which the user operates exists. Such a defined region 602 may be, for example, a building or a room. In some implementations, the defined region 602 is a region within the universe 600 that the user can view with the ARD 410. Within this defined region 602 is the bounded region 604 that is created by the user and is equivalent to the selected region as described above. In FIG. 6, there are objects $O_{xy}$ 606a, 606b, 606c (collectively or representationally 606) that are elements (e.g., computers, files, drawers, etc.) to which certain access rights are to be changed, and there are subjects $S_{xy}$ 608a, 608b, 608c (collectively or representationally 608) that are individuals for whom certain access rights are to be changed. For the sake of clarity, subjects are individuals for whom security access is to be changed, which is different from the user who is the individual making the security access change. The user may select either or both of the subjects and the secure elements at the universe 600 level, the defined region 602 level, the bounded region 604 level, and the individual level, and may create selections that may add such selections at any level together or used to create intersections of sets at any level.

In FIG. 6, first objects 606a may be those within the bounded region 604 (objects $O_{i1} \ldots O_{in}$), second objects 606b may be those within the defined region 602 (objects $O_{d1} \ldots O_{dm}$), and third objects 606c may be the remaining objects in the universe 600 (objects $O_{u1} \ldots O_{um}$), where the objects are equated to the secure elements described above. Similarly, first subjects 608a may be those within the bounded region 604 (subjects $U_{i1} \ldots U_{in}$), second subjects 608b may be those within the defined region 602 (subjects $U_{d1} \ldots U_{dn}$), and third subjects 608c may be the remaining subjects in the universe 600 (subjects $U_{u1} \ldots U_{un}$).

Returning to FIG. 4A, if the ARD 410 is a virtual reality wearable element, the ARD 410 may be located outside of the defined region 602 and the bounded region 604 may be a virtual bounded region representing a physical bounded region in a synchronized physical location. In some embodiments, the virtual reality wearable element may interact with a 360° video.

In some implementations, the AR FOV system 450 comprises a subject recognizer 458. The subject recognizer 458 may determine a unique identifier for each subject (person) who is in the defined region 602 or in the bounded region 604. Attributes including access privileges for various secure elements may be obtained, once a given subject's identity is determined, from the access control/rules database 440. If two subjects 608a are present within a bounded region 604, then the subject recognizer 458 may determine their identities using, e.g., visual features, such as facial recognition, or other known mechanisms. An access control security server (not shown) may be utilized to modify and store different types of security access rules, such as what types of access is needed or provided. Each building, area, or other defined region 602, may have varying types of security access rules that are maintained in the access control/rules database 440. The AR FOV System 450 and the ARC 410 may have access to the access control/rules database 440, e.g., via the access control security server.

The secure element security editor 462 may be used to read and/or modify security access and/or privilege attributes parameters for one or more secure elements and to produce a set of security rules 492 (FIG. 4B) (also referred to as a security profile, e.g., "profile-1") to apply. For physical elements, such as rooms, drawers, building entrances, and the like, the security editor may be used to allow subjects to enter and access these physical secure elements (e.g., an "open privilege" or a "lock privilege"). For computer-based elements, such as files, disks, processor, and other computing elements, the security editor may be used to assign typical computer-security-related accesses, such as read-only, write, execute, delete, etc. The secure element security editor 462 may ensure that the user who is making modifications has proper authority to make the requested changes by accessing the access control/rules database 440. Here, the access control of all individuals, including the user who is assigning security as well as the subjects for whom security being assigned is stored and any ultimate security rules are stored as well.

The secure element security editor 462 may display, in the ARD 410, available options for each of the secure elements viewable using the ARD 410. The user may use any form of selection mechanism described herein to select which of the options is being selected. For example, if the secure element is a particular PC sitting on a table, the secure element security editor 462 may display options of "allow subject to login" and "disable login by subject". The "allow subject to login" element may be selected by the user and applied to subjects that have already been or will be selected for applying this change to. The set of security rules to apply 492 produced by the secure element security editor 462 may then be applied as indicated below. If multiple levels of authentication are required, in some embodiments, the system may display a workflow so that the user or others may view what action(s) need(s) to be performed to provide the necessary access control.

The subject access selector 464 may be used to select a set of selected subjects 494 for whom security rules are to be applied. The subject access selector 464 may make use of boundaries created by the boundary creator 456 in order to determine subjects within a created boundary who may be subjects of a security rule. In one implementation, all of the subjects 608a within the bounded region 604 may be selected as the set of selected subjects 494. When operating on a set of subjects, the user may indicate this through use of the additional UI controls 480. For example, the user may use the voice control 482 and say, "apply boundaries to select subjects as the set of selected subjects", in which case all of the subjects within the boundary are selected as a set of selected subjects. The user may draw additional boundaries and, e.g., say "add subjects within boundaries to set of selected subjects. However, the subject access selector 464 is not limited to selecting only these subjects. Thus, it may be possible to select certain subjects 608a from those within the bounded region 604 to remove them from the selection. Additional boundaries may be subtractive instead of additive. For example, the additive boundaries may be viewed as a union of sets, and subtractive boundaries may be viewed as an intersection of sets. Any of the mathematical set operations may be utilized herein when utilizing boundaries for selection of any of the sets 492, 494, 496 described herein. Any of the boundaries or selected sets may be stored in the access control/rules database 440 for future reference or use.

Conversely, it may be possible to select certain subjects 608b, 608c to add to those subjects already selected by the bounded region 604. In one implementation, it may be possible to specify that all subjects within the defined region 602 may be selected, or that all subjects within the universe 600 are selected, with subjects being added or removed from these subject sets. The subject access selector 464 may utilize the same tools as the boundary creator 456 and operate in a similar way. The user may look at a subject and then provide an indication, using, e.g., one of the additional UI controls 480, that the subject is to be added or removed from the set of selected subjects 494. The output of the subject access selector may thus be the set of selected subjects 494, and the security access changes may then be applied to this set.

The secure element selector 466 may operate in a similar manner as the subject access selector, except that secure elements (objects 606) may be selected instead of individuals, and that a set of selected secure elements 496 is created. For example, in FIG. 6, the bounded region 604 (e.g., "boundary-1) may be applied to objects by using, e.g., the voice control 482 and the user saying, "apply boundary-1 to select secure elements as the set of selected secure elements". Similarly, the user may draw additional boundaries and add subjects within the additional boundaries to the set of selected secure elements 496, or subtract subjects from the set of selected secure elements 496.

Figure 4B:
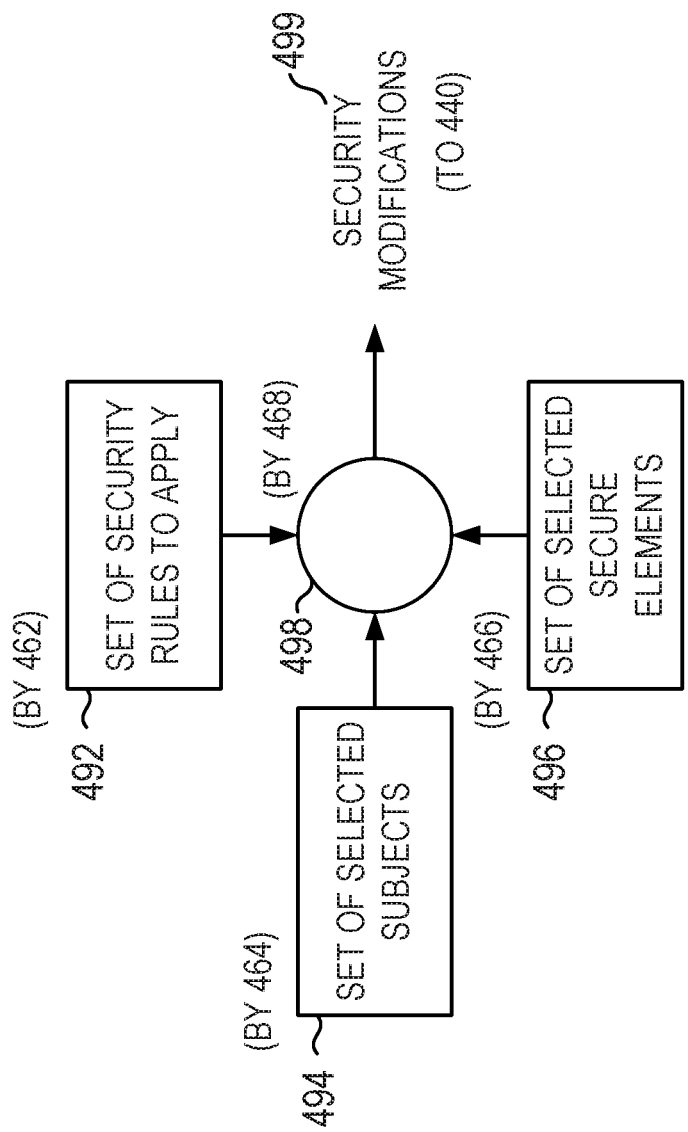
FIG. 4B is a block diagram of one or more embodiments illustrating components of the security modifications, according to some implementations.

FIG. 4B illustrates the actual modification of access 498 by the permission assigner 468. As can be seen, the set of security rules to apply 492, which was created by the secure element security editor 462, is applied using the set of selected subjects 494, which was created by the subject access selector 464, in combination with the set of selected secure elements 496, which was created by the secure element selector 466. The output of the permission assigner 468 pursuant to the modification of access 498 are security modifications 499 that may be stored in the access control/rules database 440.

By way of an illustrated example, the user may select a first and second subject 608a by creating a bounded region 604 using one of the techniques described herein. The user's identities may be determined by the subject recognizer 458. The user may then select all secure elements in the defined region 606a, 606b using the voice control 482, stating "select all secure elements within this building". Using the secure element security editor 462, the user may state, using the voice control 482 in combination with a hand-operated control 486, that all physical secure elements are to be given "open" access, and that all computer processor secure elements are to be given "login, read/write" access. When the user executes the permission assigner 468 (provided the user actually has the permission to grant the indicated access), the system applies these requested privileges for the two subjects to all secure elements within the building.

Similarly, by way of example, the user may select a secure element 606a by creating a bounded region 604 using one of the techniques described herein. The user may then select all subjects in the defined region 608a, 608b using the voice control 482, stating "select all subjects within this building". Using the secure element security editor 462, the user may state, using the voice control 482 in combination with a hand-operated control 486, that all subjects are to be given "open" access when the secure element is a physical element, and that all subjects are to be given "login, read/write" access when the secure element is a computer processor secure element. When the user executes the permission assigner 468 (provided the user actually has the permission to grant the indicated access), the system applies these requested privileges for the subjects within the building to the secure element.

In another implementation, the system may guide the user who has applied a set of security rules 492 "profile-1" to a first bounded region 604 "boundary-1", but missed applying a complimenting profile-1 to another bounded region 604 "boundary-5". In this implementation, the system may display to the user that boundary-5 needs to be set to the profile-1 selected for boundary-1 in order, e.g., to obtain a security score that meets some predefined threshold (such as one that may be set by an organization).

Figure 7:
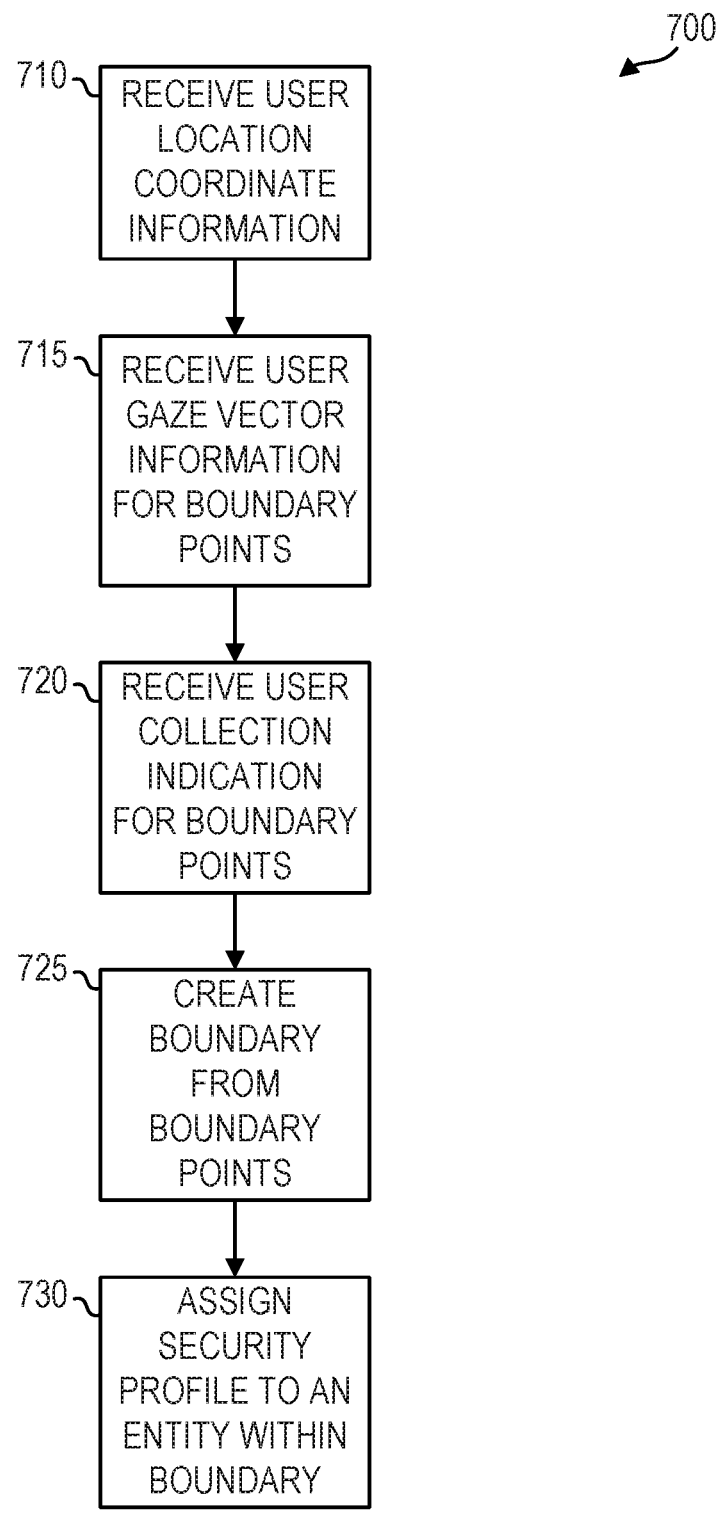
FIG. 7 is a flowchart of one or more embodiments of a process disclosed herein.

FIG. 7 is a flowchart that illustrates an example process 700 that may be utilized by the AR system 400, according to some embodiments. In operation 710, the location detection system 452 may receive the user location coordinate information. This may be performed by a GPS, triangulation, or other mechanism for determining where the user is in a world coordinate system. When the user is using a virtual reality system, a virtual coordinate system that relates to a world coordinate system may be utilized.

In operation 715, the FOV determiner 454 may receive user gaze vector information that may be utilized for determining boundary points. The intersection of the user gaze vector with a surface within the defined region 602 indicates the point that the user is looking at, and the cone of the user's view may define elements that are within the user's FOV. When the user is looking at a location intended to define a bounded region 604, in operation 720, the boundary creator 456 may receive a collection indication from the user indicating that this point should form a part of the boundary. This collection indication may also be utilized outside of the context of boundary selection, i.e., when just a subject or a secure element within the user's FOV is being selected.

In operation 725, when a boundary is being created and the boundary creator 456 has received the last point defining the boundary, the boundary creator 456 may create the bounded region 604 based on data provided that defines the type and shape of the bounded region 604. Once the boundary has been created, entities within the boundary may be identified. When the bounded region 604 is used to select subjects, the subject recognizer 458 may be used to identified those subjects within the bounded region. A selected security profile may be assigned, in operation 730, between a set of selected subjects and a set of selected objects (the "set" of each may include only a single element, despite the use of plural language).

Computer Technology and Computer Readable Media

The one or more embodiments disclosed herein accordingly provide an improvement to computer technology. For example, an improvement to a search engine allows for a more efficient and effective search for information by the user. The ability to access stored information with which the user has interacted with in some manner, and allowing the weighting of the importance of this information to decay over time beneficially improves the operation of the search and benefits the user in that more pertinent results may be presented to the user.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   receiving bounded region information that is located within a defined region associated with a user from an augmented reality device (ARD) associated with the user, wherein:
   the ARD comprises:
      a display element selected from the group consisting of glasses, smart contact lenses, helmets, and goggles; and
      a head-eye tracker that determines a direction that the user is looking in; and
   the bounded region information originates from the display element
   creating a bounded region from the bounded region information;
   selecting a first set of selectable entities as those being within the bounded region; and
   assigning a security profile to the first set of selectable entities relative to a second set of selectable entities.

2. The method of claim 1, wherein the bounded region is a first bounded region, and the bounded region information is first bounded region information, the method further comprising:
   receiving second bounded region information that is located within the defined region from the ARD;
   creating a second bounded region from the second bounded region information; and
   selecting the second set of selectable entities as those being within the second bounded region information.

3. The method of claim 1, wherein:
   the first set of selectable entities is a set of subjects; and
   the second set of selectable entities is a set of security elements.

4. The method of claim 1, wherein:
   the first set of selectable entities is a set of security elements; and
   the second set of selectable entities is a set of subjects.

5. The method of claim 1, wherein the user is located within the defined region.

6. The method of claim 1, wherein the receiving of the bounded region information comprises, by a boundary creator:

receiving user location coordinate information and user gaze vector information for each of a first and second gaze location point;

receiving a user collection indication for each of the first and second gaze location point, the user collection indication indicating that the first and second gaze location point forms at least a part of the bounded region; and using the first and second gaze location points for the creating of the bounded region.

7. The method of claim 6, wherein the receiving of the user collection indication is received from a user interface control selected from the group consisting of a voice control, a gesture control, and a hand operated control.

8. The method of claim 1, wherein:

the ARD is a virtual reality wearable element;

the ARD is located outside of the defined region; and the bounded region is a virtual bounded region representing a physical bounded region in a synchronized physical location.

9. The method of claim 1, wherein the bounded region is a first bounded region, and the bounded region information is first bounded region information, the method further comprising:

receiving second bounded region information that is located within the defined region from the ARD;

creating a second bounded region from the second bounded region information;

combining the first and second bounded regions to produce a combined bounded region using at least one of mathematical union and intersection functions.

10. The method of claim 1, wherein the assigning of the security profile comprises:

receiving a user indication of a security profile to utilize; and applying the security profile.

11. The method of claim 10, further comprising:

presenting a plurality of security profiles to the user; and wherein the receiving of the user indication comprises receiving a user selection of the security profile to utilize.

12. The method of claim 1, wherein the bounded region is user selectable between a 2D area and a 3D volume.

13. The method of claim 1, further comprising:

adding to or removing from the first set of selectable entities a further entity based on a gaze vector, a field of view, and a user collection indication.

14. The method of claim 1, wherein the security profile comprises:

for a physical object, privilege attributes of open and lock;

for a computer-based object, privilege attributes of read-only, write, execute, and delete.

15. The method of claim 1, further comprising recognizing a subject using a subject recognizer.

16. The method of claim 1, wherein the bounded region is a first bounded region, and the bounded region information is first bounded region information, the method further comprising: receiving second bounded region information that is located within the defined region from the ARD; creating a second bounded region from the second bounded region information; and selecting the second set of selectable entities as those being within the second bounded region information; wherein: the first set of selectable entities is a set of subjects; the second set of selectable entities is a set of security elements; the receiving of the second bounded region information com prises, by a boundary creator: receiving user location coordinate information and user gaze vector information for each of a first and second gaze location point; receiving a user collection indication for each of the first and second gaze location point, the user collection indication indicating that the first and second gaze location point forms at least a part of the bounded region; and using the first and second gaze location points for the creating of the second bounded region; the receiving of the user collection indication is received from a user interface control selected from the group consisting of a voice control, a gesture control, and a hand operated control; the assigning of the security profile comprises: receiving a user indication of a security profile to utilize; and applying the security profile, the method further comprising: combining the first and second bounded regions to produce a combined bounded region using at least one of mathematical union and intersection functions.

17. A security profile assignment system, comprising a processor configured to: receive bounded region information that is located within a defined region associated with a user from an augmented reality device (ARD) associated with the user, wherein: the ARD comprises: a display element selected from the group consisting of glasses, smart contact lenses, helmets, and goggles, and a head-eye tracker that determines a direction that the user is looking in; and the bounded region information originates from the display element; create a bounded region from the bounded region information; select a first set of selectable entities as those being within the bounded region; and assign a security profile to the first set of selectable entities relative to a second set of selectable entities, wherein: the first set of selectable entities is a set of subjects; and the second set of selectable entities is a set of security elements.

18. The system of claim 17, wherein the first set of selectable entities is selected from the group consisting of a set of subjects and a set of security elements, and the second set of selectable entities is selected from the group consisting of a set of security elements and a set of subjects, respectively.

19. A computer program product for a security profile assignment system, the computer program product comprising a computer readable storage medium having computer-readable program code embodied therewith to, when executed on a processor: receive bounded region information that is located within a defined region associated with a user from an augmented reality device (ARD) associated with the user, wherein: the ARD comprises: a display element selected from the group consisting of glasses, smart contact lenses, helmets, and goggles; and a head-eye tracker that determines a direction that the user is looking in; and the bounded region information originates from the display element; create a bounded region from the bounded region; select a first set of selectable entities as those being within the bounded region information; and assign a security profile to the first set of selectable entities relative to a second set of selectable entities, wherein: the first set of selectable entities is a set of security elements; and the second set of selectable entities is a set of subjects.

\* \* \* \* \*